(12) United States Patent
Hamilton

(10) Patent No.: US 8,116,015 B2
(45) Date of Patent: Feb. 14, 2012

(54) MONOCULAR WITH ATTACHMENT POINTS

(75) Inventor: Samuel J. Hamilton, Mount Horeb, WI (US)

(73) Assignee: Sheltered Wings, Inc., Middleton, WI (US)

( * ) Notice: Subject to any disclaimer, the term of this patent is extended or adjusted under 35 U.S.C. 154(b) by 217 days.

(21) Appl. No.: 12/316,980

(22) Filed: Dec. 18, 2008

(65) Prior Publication Data

US 2010/0157447 A1    Jun. 24, 2010

(51) Int. Cl.
*G02B 7/02* (2006.01)

(52) U.S. Cl. ........................................................ 359/818

(58) Field of Classification Search ........... 359/816–819
See application file for complete search history.

(56) References Cited

U.S. PATENT DOCUMENTS

| | | | | |
|---|---|---|---|---|
| 5,644,426 A | * | 7/1997 | Hotta | 359/409 |
| 5,930,036 A | * | 7/1999 | Cluff | 359/420 |
| 6,849,849 B1 | * | 2/2005 | Warner et al. | 250/330 |
| 2007/0068058 A1 | * | 3/2007 | Remo | 42/122 |

* cited by examiner

*Primary Examiner* — Scott J Sugarman
*Assistant Examiner* — Vipin Patel
(74) *Attorney, Agent, or Firm* — Bennet K. Langlotz; Langlotz Patent & Trademark Works, Inc.

(57) ABSTRACT

A monocular with attachment points has a tubular frame with a hard point attached to its exterior an optical axis defined by its center axis. A clip may have one end connected to the hard point. There may be two hard points attached to the frame's exterior, and the clip may be operable to detach from and reattach to either of the hard points. The hard points may be arranged in pairs on opposite sides of the frame's exterior. There may be a hand strap operable to detach from and reattach to any of the pairs of hard points. There may be a mounting surface rigidly connected to the frame's exterior. The mounting surface may be parallel to the optical axis and operable to receive a tripod mount and a picatinny rail mounting plate.

24 Claims, 8 Drawing Sheets

MONOCULAR WITH ATTACHMENT POINTS

FIELD OF THE INVENTION

The present invention relates to a monocular with attachment points for use in connection with range finding. The monocular with attachment points has particular utility in connection with providing a highly portable monocular with ambidextrous operation.

BACKGROUND OF THE INVENTION

Monoculars with attachment points are desirable for providing a highly portable monocular with ambidextrous operation. A monocular is a modified refracting telescope used to magnify the images of distant objects by passing light through a series of lenses and prisms. The use of prisms results in a lightweight telescope. Volume and weight are less than half those of binoculars, making monoculars easier to carry. For this reason, monoculars are typically used in hunting, police, and military applications because binoculars are much heavier and bulkier.

However, prior art monoculars used in these instances are miniaturized to fit inside a regular pocket. This makes the monocular difficult to access and stow quickly. Furthermore, the monocular's reduced size both limits its magnification power and results in smaller focus controls that make it more awkward to use.

Therefore, a need exists for a new and improved monocular with attachment points that can be used for providing a highly portable monocular with ambidextrous operation. In this regard, the various embodiments of the present invention substantially fulfill at least some of these needs. In this respect, the monocular with attachment points according to the present invention substantially departs from the conventional concepts and designs of the prior art, and in doing so provides an apparatus primarily developed for the purpose of providing a highly portable monocular with ambidextrous operation.

SUMMARY OF THE INVENTION

The present invention provides an improved monocular with attachment points, and overcomes the above-mentioned disadvantages and drawbacks of the prior art. As such, the general purpose of the present invention, which will be described subsequently in greater detail, is to provide an improved monocular with attachment points that has all the advantages of the prior art mentioned above.

To attain this, the preferred embodiment of the present invention essentially comprises a tubular frame with a hard point attached to its exterior and an optical axis defined by its center axis. A clip may have one end connected to the hard point. There may be two hard points attached to the frame's exterior, and the clip may be operable to detach from and reattach to either of the hard points. Hard points may be arranged in pairs on opposite sides of the frame's exterior. There may be a hand strap operable to detach from and reattach to any of the pairs of hard points. There may be a mounting surface rigidly connected to the frame's exterior. The mounting surface may be parallel to the optical axis and operable to receive a tripod mount and a picatinny rail mounting plate. There are, of course, additional features of the invention that will be described hereinafter and which will form the subject matter of the claims attached.

There has thus been outlined, rather broadly, the more important features of the invention in order that the detailed description thereof that follows may be better understood and in order that the present contribution to the art may be better appreciated.

BRIEF DESCRIPTION OF THE DRAWINGS

The same reference numerals refer to the same parts throughout the various figures.

DESCRIPTION OF THE CURRENT EMBODIMENT

Figure 1:
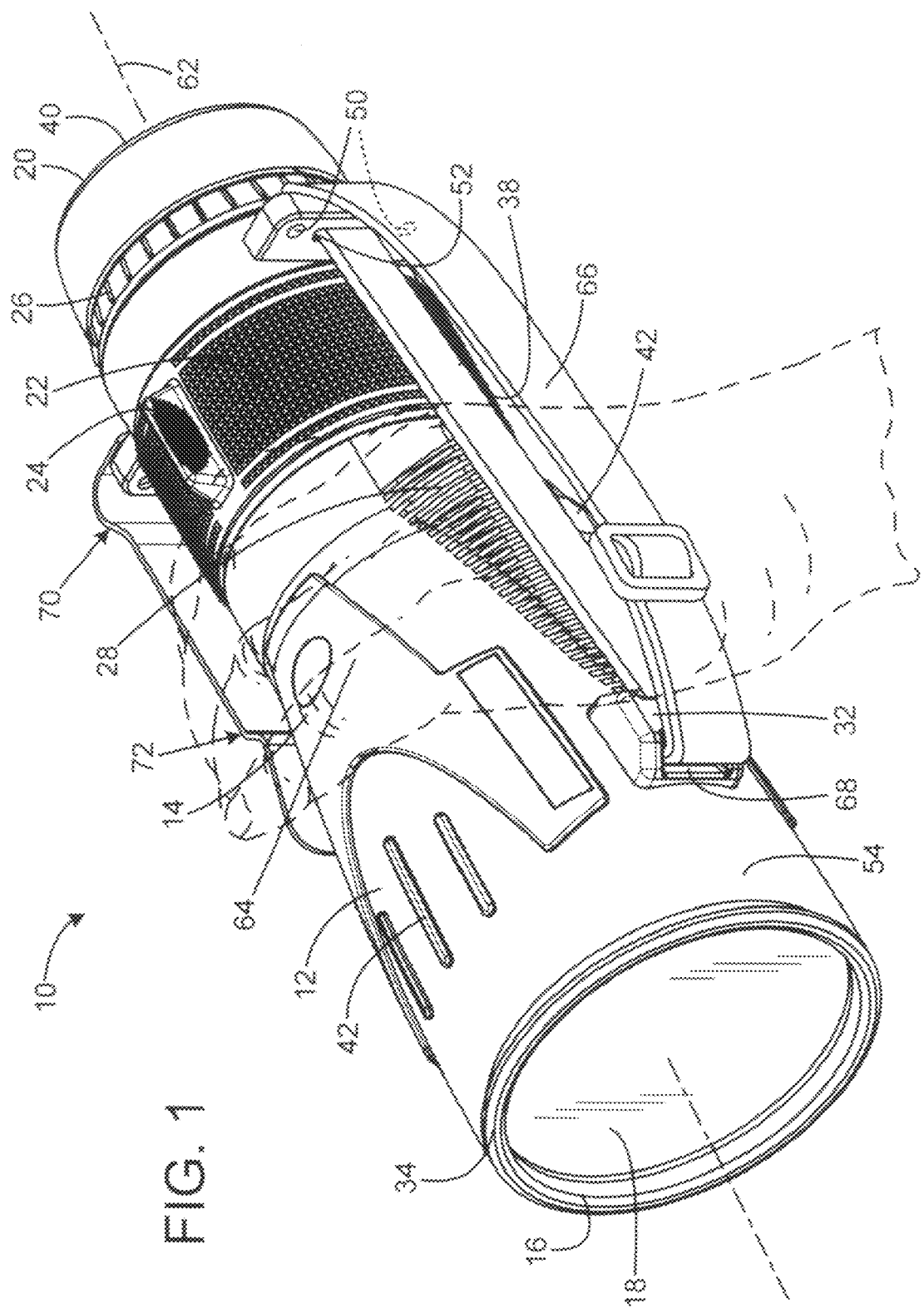
FIG. 1 is a left side perspective view of the current embodiment of the monocular with attachment points constructed in accordance with the principles of the present invention.

A preferred embodiment of the monocular with attachment points of the present invention is shown and generally designated by the reference numeral 10.

FIG. 1 illustrates the left side 54 of the improved monocular with attachment points 10 of the present invention. More particularly, the monocular 10 is a tactical ranging monocular that can be made in sizes of 10×50 mm, 15×50 mm, and others. The monocular 10 has a length of about 7 inches and a weight of about 15 to 19 ounces. The monocular 10 has a field of view at 8× magnification of about 350-375 feet/1000 yards and a field of view at 10× magnification of about 325-350 feet/1000 yards. The monocular 10 has a long eye relief of about 17-19 mm, a resolving power of less than 6 seconds, and is argon purged and waterproof to a depth of 5 m. The monocular 10 has a focus range of about 15 feet to infinity, and its main focus ring 22 rotates from about 90-135° to focus from about 15 feet to infinity. The monocular 10 includes a custom reticle option, which is adaptable to the user's desired target type.

The monocular 10 is constructed with a frame 12 having a front 34, a rear 40, a top 42, a bottom 38, a left side 54, and a right side 36. The frame 12 is an elongate tube tapering from a larger opening at its front 34 to a smaller opening at its rear 40. The center axis of the frame 12 defines the optical axis 62 of the monocular 10. The frame 12 is made of lightweight, fiber-reinforced polycarbonate.

The exterior of the frame 12, except for its exposed attachment points, is covered by a body covering 14. The body covering 14 is made of a modified thermoplastic rubber and provides the frame 12 with a rugged armored exterior that is exceptionally shockproof.

An objective lens 18 is recessed in the front 34 of the frame 12, which enables objective lens threads 16 to be present in the front 34 of the frame 12. The lens threads 16 optionally receive an accessory for eliminating reflection from the objective lens 18 or an accessory for doubling the magnification of the monocular 10.

The rear 40 of the frame 12 terminates in an eyecup 20. The eyecup 20 positions the user's eye at the proper distance for the eye relief. The eyecup 20 can be either a foldable rubber style eyecup or a twist up and down style eyecup. Both types of eyecups are adjustable for the presence or absence of eyeglasses.

Both styles of eyecups are available because they have different benefits and drawbacks. The twist up and down style is convenient because it is easier to adjust then folding a rubber eyecup down. It also does not wear out with use like the foldable rubber style, which begins to crack after years of folding. However, the twist up and down style eyecup's mechanism can be damaged by a hard impact that the foldable rubber style can survive. The twist up and down style eyecup is also vulnerable to becoming impaired by the entry of sand and grit into its mechanism.

The foldable rubber style eyecup can accommodate a side shield so that users without eyeglasses can block out light coming from the side. The twist up and down style cannot be used with a side shield because it interferes with the use of eyeglasses. For these reasons, the monocular 10 is typically equipped with a foldable rubber style eyecup for military and law enforcement use and a twist up and down style eyecup for hunting and other consumer applications. However, both types of eyecups can be replaced with the other one by factory modification of the monocular 10.

A reticle focusing ring 26, which adjusts the focus of the reticle of the monocular 10 relative to the background, connects the eye cup 22 to the frame 12. The reticle focusing ring 26 has a series of raised tick marks on its exterior to facilitate its rotation. The main focusing ring 22, which adjusts the focus of the background, is rotatably mounted on the exterior of the frame 12 at its rear 40. The main focusing ring 22 has a knurled surface and a protruding lever 24 to facilitate its rotation. Both the reticle focusing ring 26 and the main focusing ring 22 are designed for one-handed operation by the fingers and thumb of the hand 64 holding the monocular 10.

A fin 28, ear 46, and strap mount 32 protrude from the left side 54 of the frame 12. The fin 28 is a series of modified thermoplastic rubber ridges that are integral to the body covering 14. The fin 28 provides the user's hand 64 with a comfortable ergonomic grip on the monocular 10. The ear 46 has two bolt holes 50 in its opposing ends and a strap slot 52 in its center. The strap mount 32 has two strap slots 68 in its opposing sides that are in communication with one another. The ear 46 and strap mount 32 are hard points that are attached rigidly to the frame 12.

As depicted in FIG. 1, a hand strap 66 is removably inserted through the strap slot 52 and strap slots 68. The hand strap 66 enables the user to hold the monocular 10 like a camcorder with the bottom 38 of the frame 12 resting in the palm of the hand 64 with the fingers and thumb free to operate the main focusing ring 22 and the reticle focusing ring 26. This leaves the user's other hand free to perform other tasks. Alternatively, the hand strap 66 can be used to releasably secure the monocular 10 to the back of the user's hand 64 so the hand 64 can manipulate other objects.

Figure 2:
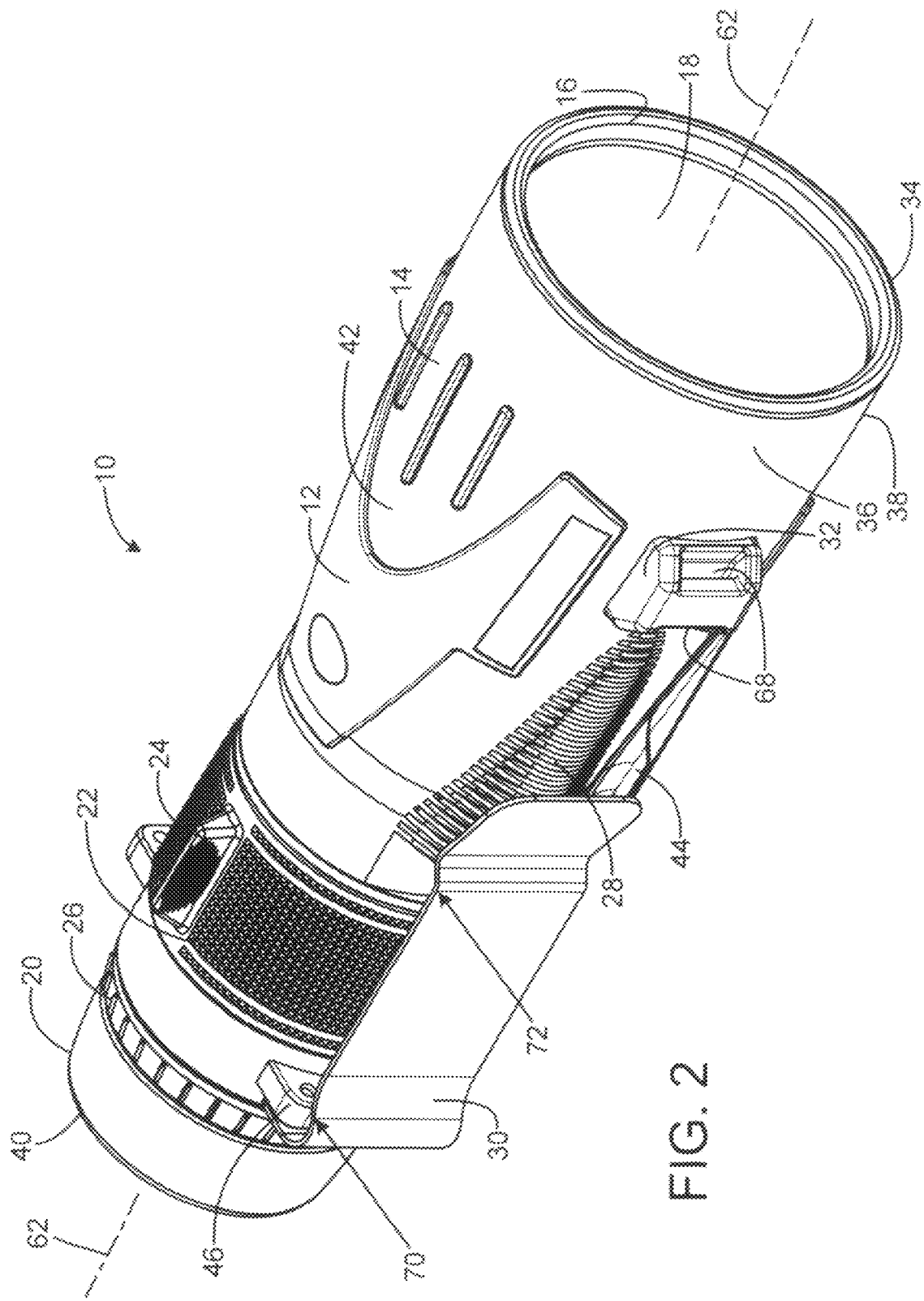
FIG. 2 is a right side perspective view of the current embodiment of the monocular with attachment points of the present invention.

FIG. 2 illustrates the right side 36 of the improved monocular with attachment points 10 of the present invention. More particularly, the right side 36 of the monocular 10 has a fin 28, ear 46, and strap mount 32 protruding from it in the same relative positions on the frame 12 as those on the left side 54. A clip 30 is removably attached to the ear 46. The clip 30 is adapted to receive a belt or can receive the Pouch Attachment Ladder System (PALS) webbing of MOdular Lightweight Load-carrying Equipment (MOLLE). The clip 30 is adapted to go through two PALS ladder loops so the monocular 10 will be firmly secured to the user's MOLLE vest. This is accomplished by the clip 30 having a width of about 25 mm and the distance from the bottom of the strap attachment point 72 to where the clip 30 begins to curve 70 being about 65.2 mm. The distance from the bottom of the strap attachment point 72 to where the clip 30 begins to curve 70 just exceeds 2.5 inches, which is the distance from the top of one PALS webbing loop to the bottom of the webbing loop below it.

Figure 3:
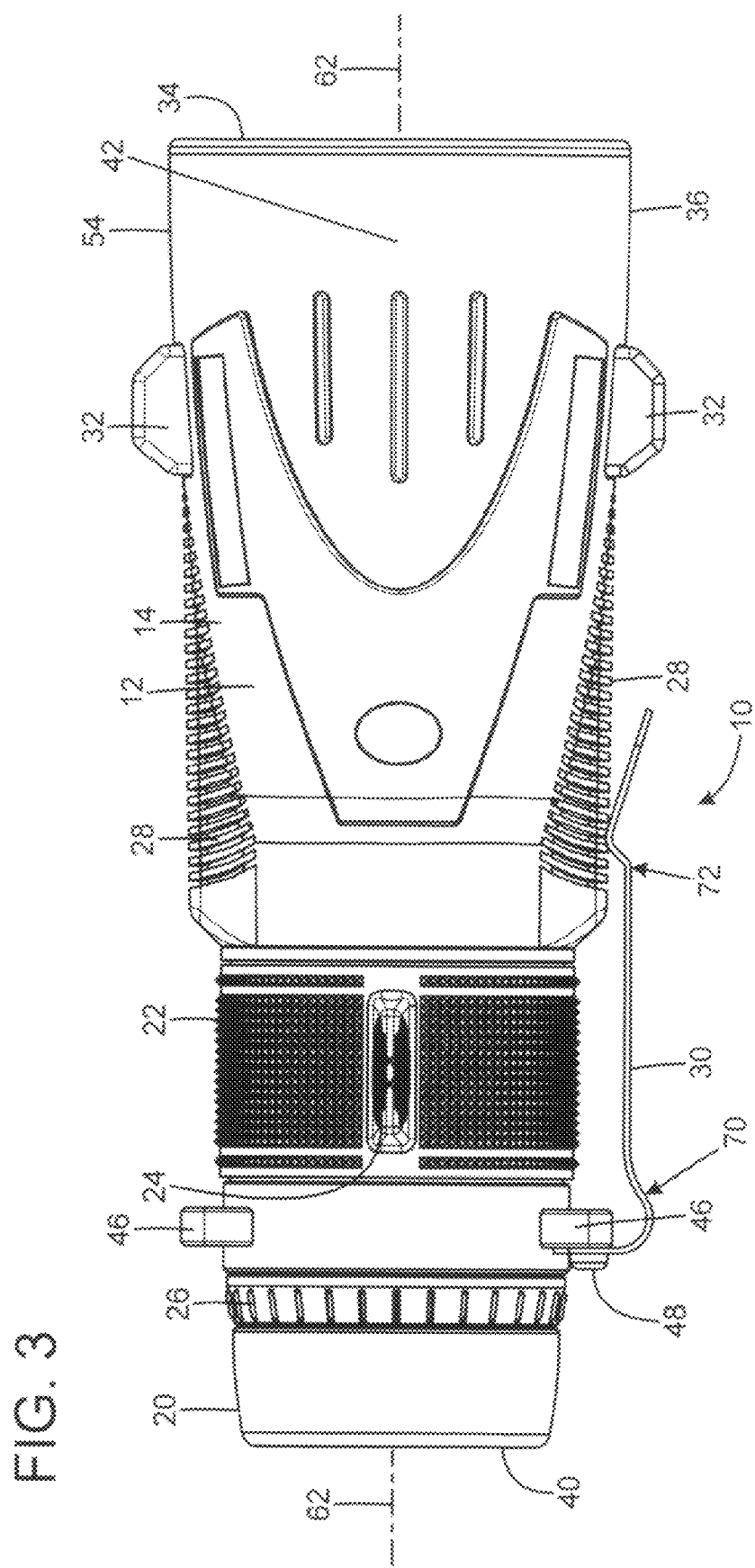
FIG. 3 is a top view of the current embodiment of the monocular with attachment points of the present invention.

FIG. 3 illustrates the top 42 of the improved monocular with attachment points 10 of the present invention. More particularly, it is apparent that the right side 36 and the left side 54 of the monocular 10 are mirror images of one another. The clip 30 is shown removably attached to the ear 46 on the right side 36 by bolts 48. Bolts 48 are threadedly inserted into the bolt holes 50 in the ear 46. The adjacent fin 28 provides a substantially parallel surface for the free end of the clip 30 to rest against.

The monocular 10 is ambidextrous because the clip 30 and/or hand strap 66 can be attached to either side. This enables one-handed operation with either of the user's hands, which otherwise would be impossible because the reticle of the monocular 10 must always be upright in operation.

Figure 4:
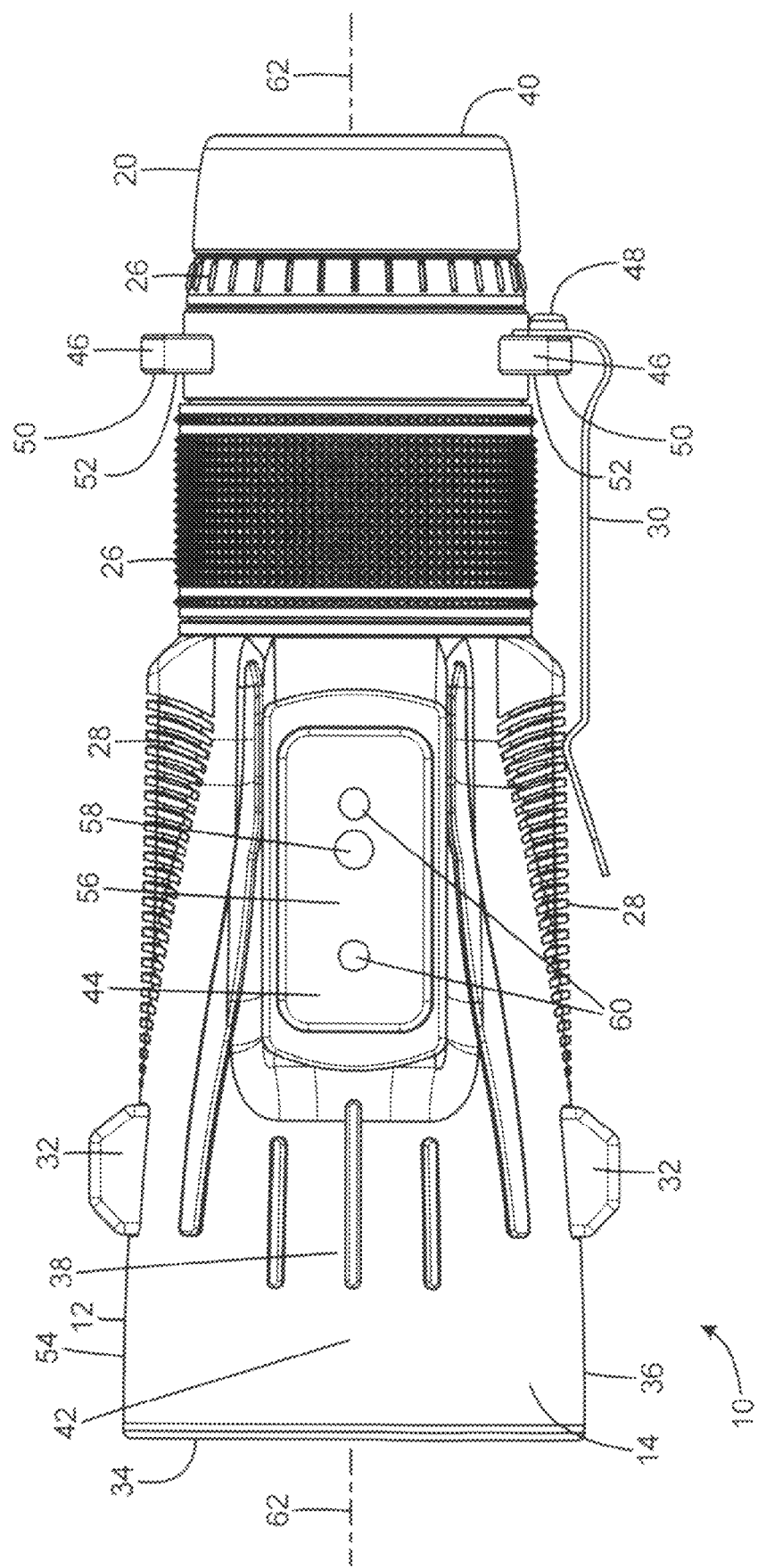
FIG. 4 is a bottom view of the current embodiment of the monocular with attachment points of the present invention.

FIG. 4 illustrates the bottom 38 of the improved monocular with attachment points 10 of the present invention 10. More particularly, the bottom 38 of the frame 12 has a mounting facility 44 rigidly attached. The mounting facility 44 terminates in a mounting surface 56 that is parallel to the optical axis 62. The mounting surface 56 has a standard tripod mount ¼-20 thread hole 58 in its center to threadedly connect the monocular 10 to a tripod. The opposing ends of the mounting surface 56 each have a 10-32 thread hole 60 that together enable the monocular 10 to receive a plate so the monocular 10 can be mounted on a picatinny rail. The holes 60 can also be used to attach accessories to the monocular 10, such as an electronic compass, laser range finder, or global positioning system. These accessories can be used to provide information to an electronic display within the monocular 10 that is viewable through the eyecup 20.

Figure 5:
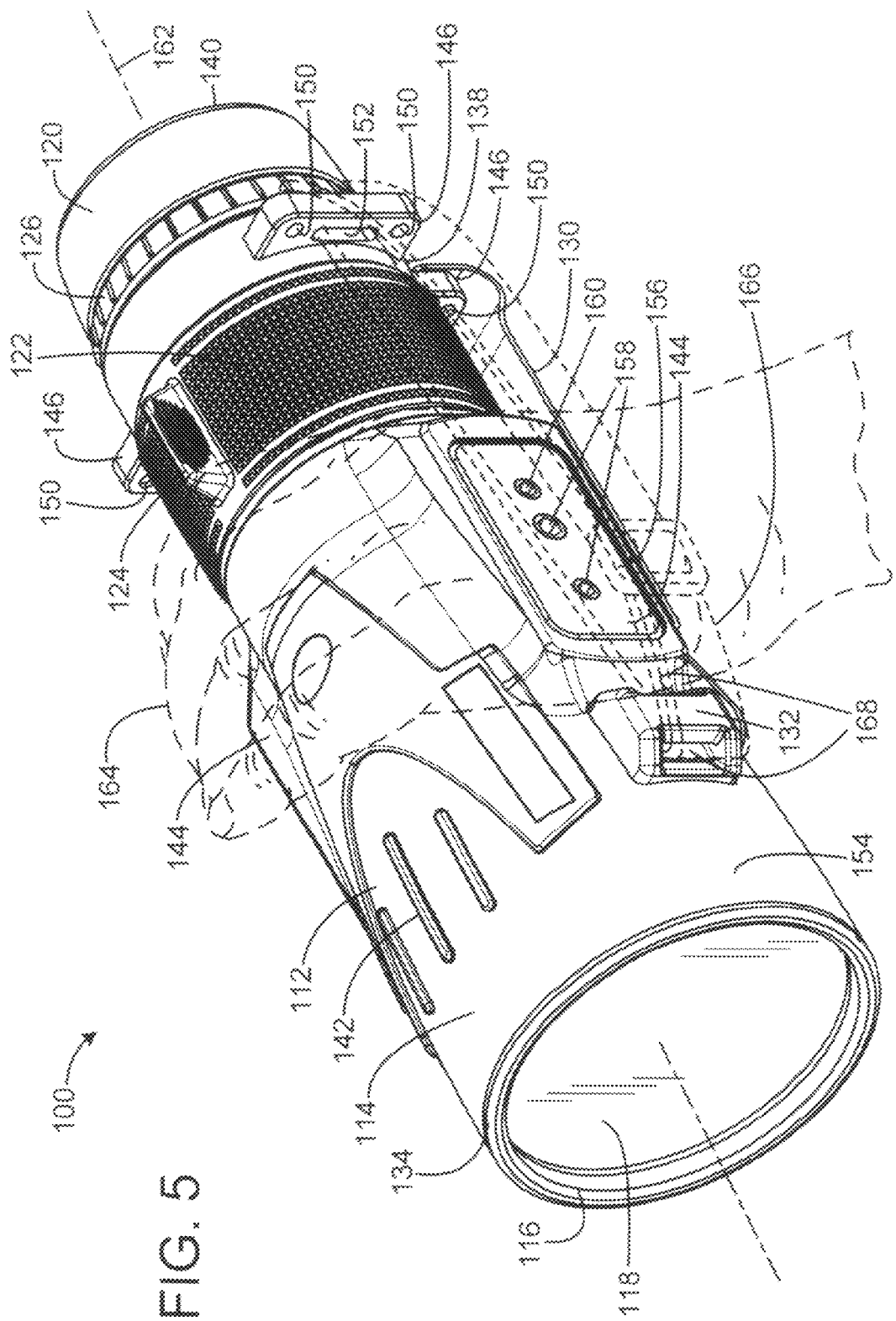
FIG. 5 is a left side perspective view of an alternative embodiment of the monocular with attachment points constructed in accordance with the principles of the present invention.

FIG. 5 illustrates the left side 154 of an alternative embodiment of the improved monocular with attachment points 100 of the present invention. More particularly, the monocular 100 is a tactical ranging monocular that can be made in sizes of 10×50 mm, 15×50 mm, and others. The monocular 100 has a length of about 7 inches and a weight of about 15 to 19 ounces. The monocular 100 has a field of view at 8× magnification of about 350-375 feet/1000 yards and a field of view at 10× magnification of about 325-350 feet/1000 yards. The monocular 100 has a long eye relief of about 17-19 mm, a resolving power of less than 6 seconds, and is argon purged and waterproof to a depth of 5 m. The monocular 100 has a focus range of about 15 feet to infinity, and its main focus ring 122 rotates from about 90-135° to focus from about 15 feet to infinity. The monocular 100 includes a custom reticle option, which is adaptable to the user's desired target type.

The monocular 100 is constructed with a frame 112 having a front 134, a rear 140, a top 142, a bottom 138, a left side 154, and a right side 136. The frame 112 is an elongate tube tapering from a larger opening at its front 134 to a smaller opening at its rear 140. The center axis of the frame 112 defines the optical axis 162 of the monocular 100. The frame 112 is made of lightweight, fiber-reinforced polycarbonate.

The exterior of the frame 112, except for its exposed attachment points, is covered by a body covering 114. The body covering 114 is made of a modified thermoplastic rubber and provides the frame 112 with a rugged armored exterior that is exceptionally shockproof.

An objective lens 118 is recessed in the front 134 of the frame 112, which enables objective lens threads 116 to be present in the front 134 of the frame 112. The lens threads 116 optionally receive an accessory for eliminating reflection from the objective lens 118 or an accessory for doubling the magnification of the monocular 100.

The rear 140 of the frame 112 terminates in an eyecup 120. The eyecup 120 positions the user's eye at the proper distance for the eye relief. The eyecup 120 can be either a foldable rubber style eyecup or a twist up and down style eyecup. Both types of eyecups are adjustable for the presence or absence of eyeglasses. Both kinds of eyecups can be replaced with the other one by factory modification of the monocular 100.

A reticle focusing ring 126, which adjusts the focus of the reticle of the monocular 100 relative to the background, connects the eye cup 122 to the frame 112. The reticle focusing ring 126 has a series of raised tick marks on its exterior to facilitate its rotation. The main focusing ring 122, which adjusts the focus of the background, is rotatably mounted on the exterior of the frame 112 at its rear 140. The main focusing ring 122 has a knurled surface and a protruding lever 124 to facilitate its rotation. Both the reticle focusing ring 126 and the main focusing ring 122 are designed for one-handed operation by the fingers and thumb of the hand 164 holding the monocular 100.

A mounting facility 144, ear 146, and strap mount 132 protrude from the left side 154 of the frame 112. The ear 146 has two bolt holes 150 in its opposing ends and a strap slot 52 in its center. The strap mount 132 has two strap slots 68 in its opposing sides that are in communication with one another. The ear 146 and strap mount 132 are hard points that are attached rigidly to the frame 12.

The mounting facility 144 is rigidly attached to the frame 112 and terminates in a mounting surface 156 that is parallel to the optical axis 162. The mounting surface 156 has a standard tripod mount ¼-20 thread hole 158 in its center to threadedly connect the monocular 100 to a tripod. The opposing ends of the mounting surface 156 each have a 10-32 thread hole 160 that together enable the monocular 100 to receive a plate so the monocular 100 can be mounted on a picatinny rail. The holes 160 can also be used to attach accessories to the monocular 100, such as an electronic compass, laser range finder, or global positioning system. These accessories can be used to provide information to an electronic display within the monocular 100 that is viewable through the eyecup 120.

As depicted in FIG. 5, a hand strap 166 is removably inserted through the strap slot 152 and strap slots 168. The hand strap 166 enables the user to hold the monocular 100 like a camcorder with the bottom 138 of the frame 112 resting in the palm of the hand 164 with the fingers and thumb free to operate the main focusing ring 122 and the reticle focusing ring 126. This leaves the user's other hand free to perform other tasks. Alternatively, the hand strap 166 can be used to releasably secure the monocular 100 to the back of the user's hand 164 so the hand 164 can manipulate other objects.

Figure 6:
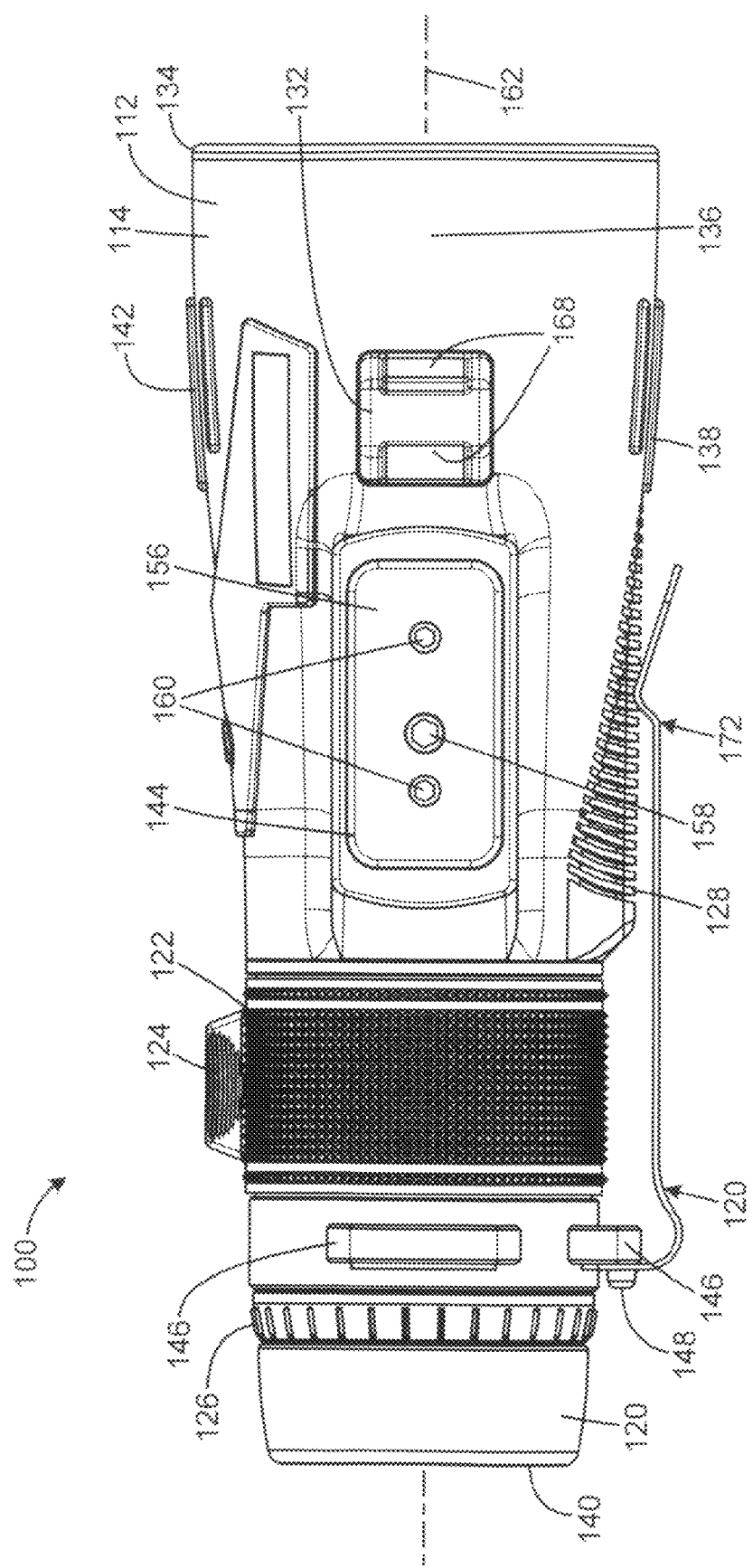
FIG. 6 is a right side perspective view of the alternative embodiment of the monocular with attachment points of the present invention.

FIG. 6 illustrates the right side 136 of the improved monocular with attachment points 100 of the present invention. More particularly, the right side 136 of the monocular 100 has a mounting facility 144, ear 146, and strap mount 132 protruding from it in the same relative positions on the frame 112 as those on the left side 54. A fin 128 and ear 146 protrude from the bottom 138 of the frame 112. The fin 128 is a series of modified thermoplastic rubber ridges that are integral to the body covering 114. The fin 128 provides the user's hand 64 with a comfortable ergonomic grip on the monocular 100.

A clip 130 is removably attached to the ear 146 attached to the bottom 138 of the frame 112. The clip 130 is adapted to receive a belt or can receive the Pouch Attachment Ladder System (PALS) webbing of MOdular Lightweight Load-carrying Equipment (MOLLE). The clip 130 is adapted to go through two PALS ladder loops so the monocular 100 will be firmly secured to the user's MOLLE vest. This is accomplished by the clip 130 having a width of about 25 mm and the distance from the bottom of the strap attachment point 172 to where the clip 30 begins to curve 170 being about 65.2 mm. The distance from the bottom of the strap attachment point 172 to where the clip 30 begins to curve 170 just exceeds 2.5 inches, which is the distance from the top of one PALS webbing loop to the bottom of the webbing loop below it. The clip 130 is shown removably attached to the ear 146 on the bottom 138 by bolts 148. Bolts 148 are threadedly inserted into the bolt holes 150 in the ear 146. The adjacent fin 28 provides a substantially parallel surface for the free end of the clip 30 to rest against.

Figure 7:
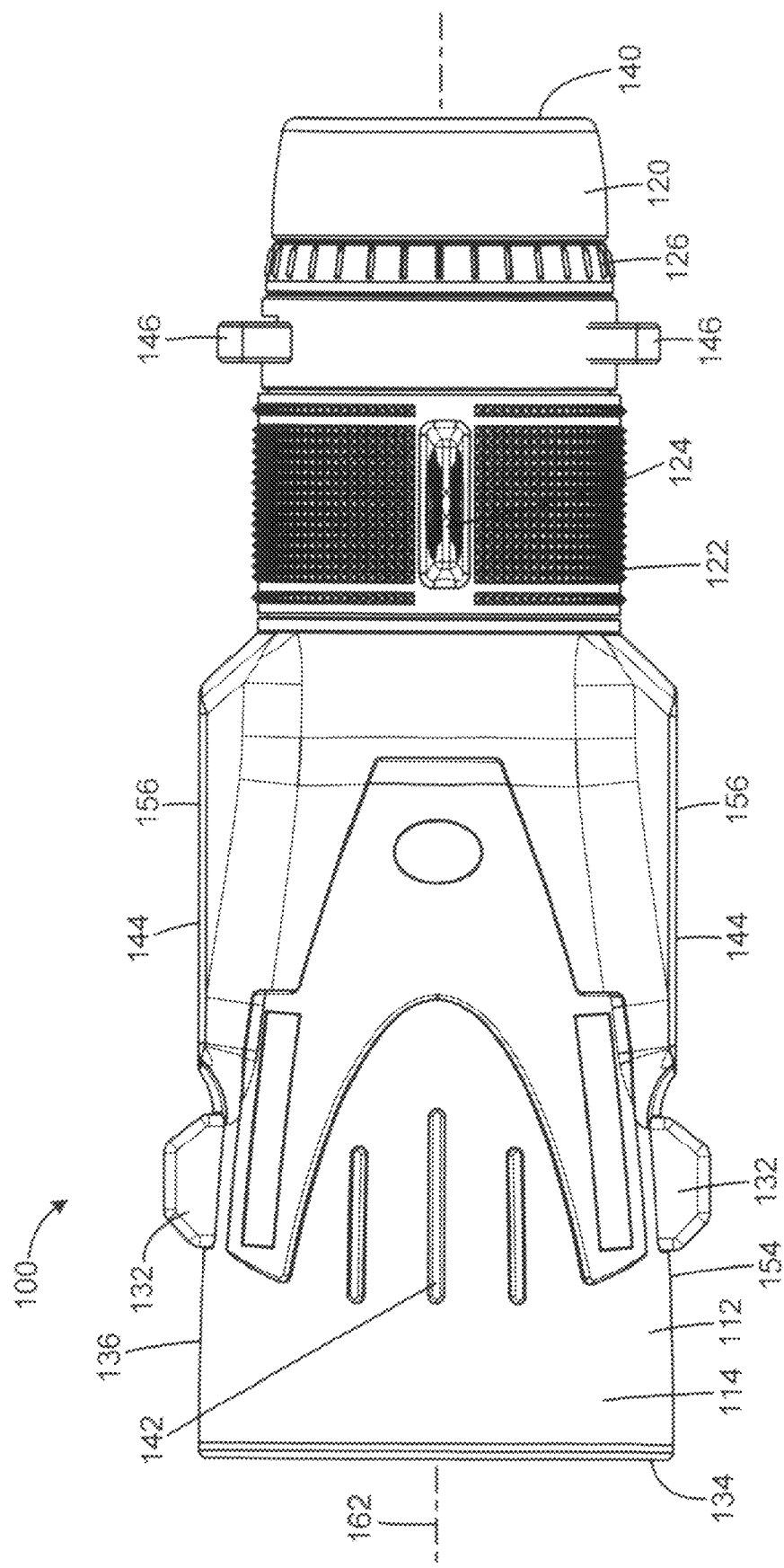
FIG. 7 is a top view of the alternative embodiment of the monocular with attachment points of the present invention.

FIG. 7 illustrates the top 142 of the improved monocular with attachment points 100 of the present invention. More particularly, it is apparent that the right side 136 and the left side 154 of the monocular 10 are mirror images of one another. The monocular 100 is ambidextrous because the hand strap 166 can be attached to either side. This enables one-handed operation with either of the user's hands, which otherwise would be impossible because the reticle of the monocular 100 must always be upright in operation.

Figure 8:
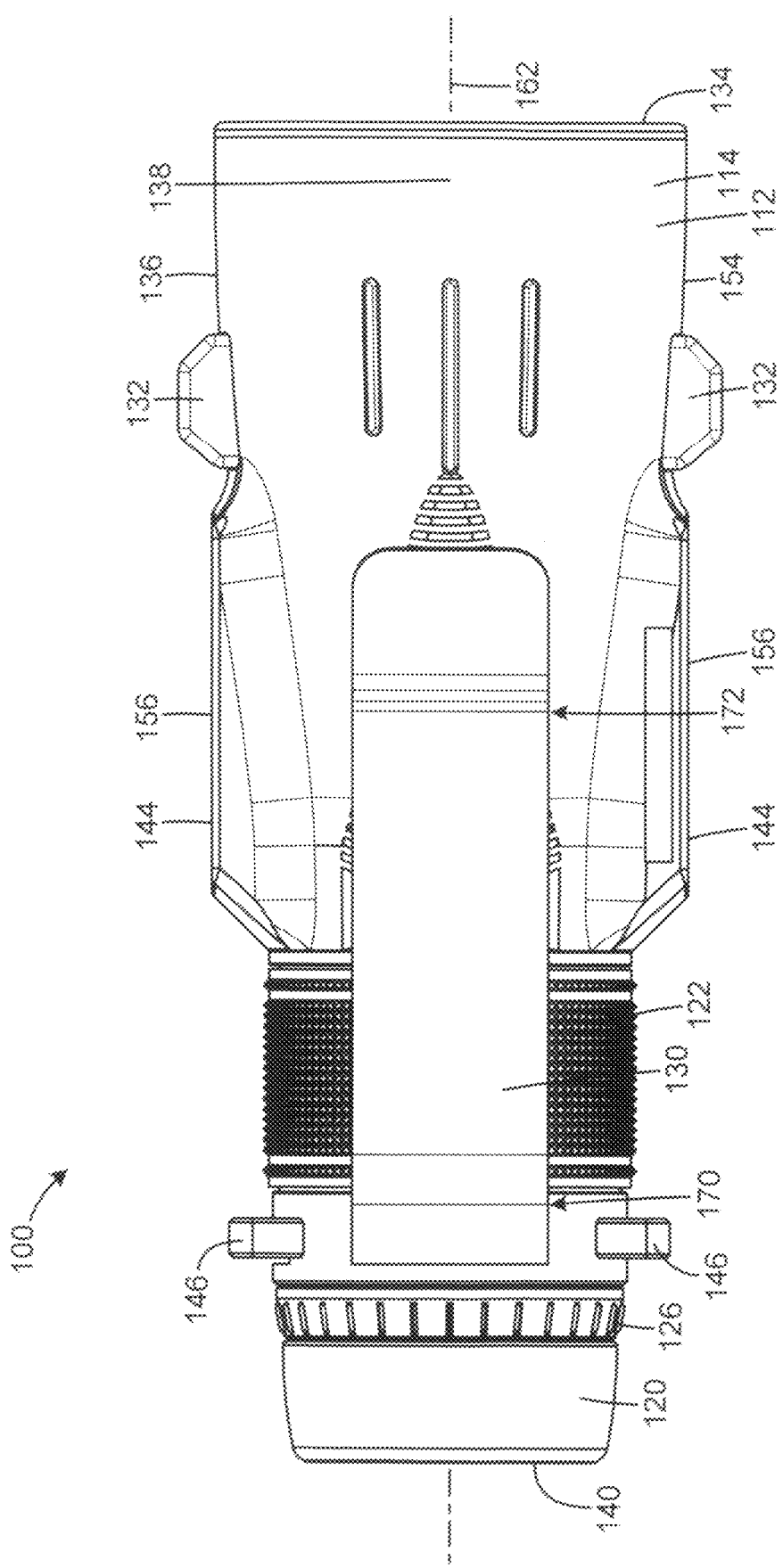
FIG. 8 is a bottom view of the alternative embodiment of the monocular with attachment points of the present invention.

FIG. 8 illustrates the bottom 138 of the improved monocular with attachment points 100 of the present invention. More particularly, the clip 130 is removably attached to the bottom 138 of the frame 112. With the clip 130 attached to the bottom 138, the user's thumb naturally rests on the clip 130. This creates a gap between the thumb and the main focus ring 122. This enables the user to both manipulate the main focus ring 122 and comfortably hold the monocular 100 because the user's thumb does not contact the main focus ring 122 and interfere with its movement.

The mounting facilities 144 are attached to the sides of the monocular 100 to enable a laser rangefinder to be easily used with the monocular 100. This allows picatinny rails to be attached on either side of the monocular 100. The picatinny rails enable a laser rangefinder to be attached to either side of the monocular 100, while an optional angled adapter bracket permits a tripod to be attached below the monocular 100.

While current embodiments of the monocular with attachment points have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A monocular with attachment points comprising:
   a tubular frame;
   the frame defining a bore;
   the bore receiving a plurality of optical elements defining an optical axis;
   the frame including a plurality of hard points attached to its exterior;
   a clip having opposing ends with one end connected to a first one of the hard points;
   wherein the clip is operable to detach from and reattach to a second one of the hard points; and
   a hand strap removably connected to two of the hard points.

2. The monocular of claim 1, wherein the hard points are located on opposing sides of the frame's exterior.

3. The monocular of claim 1, further comprising an elastomeric coating covering the exterior of the frame, wherein the elastomeric coating leaves the hard point exposed.

4. The monocular of claim 1, wherein the additional hard points are arranged in a pair on opposite sides of the frame's exterior.

5. The monocular of claim 4, wherein the clip is operable to detach from and reattach to at least one of the hard points on each side of the frame's exterior.

6. The monocular of claim 4, wherein the hand strap is operable to detach from and reattach to any of the pairs of hard points.

7. The monocular of claim 4, wherein the hand strap is operable to detach from and reattach to any of the pairs of hard points.

8. The monocular of claim 1, wherein the clip is operable to receive at least one of the group comprising belts, straps, and webbing.

9. The monocular of claim 1, further comprising a mounting surface rigidly connected to the frame's exterior.

10. The monocular of claim 9, wherein the mounting surface is parallel to the optical axis.

11. The monocular of claim 9, wherein the mounting surface is operable to receive a tripod mount.

12. The monocular of claim 9, wherein the mounting surface is operable to receive a picatinny rail mounting plate.

13. A monocular with attachment elements comprising:
    a tubular frame including a mounting surface rigidly connected to its exterior and an optical axis defined by its center axis;
    a plurality of additional hard points attached to the frame's exterior;
    a clip having opposing ends with one end connected to one of the hard points;
    wherein the clip is operable to detach from and reattach to any of the hard points; and
    a hand strap removably connected to two of the hard points.

14. The monocular of claim 13, wherein the mounting surface is parallel to the optical axis.

15. The monocular of claim 14, wherein the mounting surface is elongate with its longer portion extending parallel to the optical axis.

16. The monocular of claim 13, wherein the mounting surface is operable to receive a tripod mount.

17. The monocular of claim 13, wherein the mounting surface is operable to receive a picatinny rail mounting plate.

18. The monocular of claim 13, further comprising a rubberized coating covering the exterior of the frame, wherein the rubberized coating leaves the mounting surface exposed.

19. A monocular with attachment points comprising:
    a tubular frame;
    the frame defining a bore;
    the bore receiving a plurality of optical elements defining an optical axis;
    the frame including a plurality of hard points attached to its exterior;
    wherein the hard points are arranged in pairs on opposite sides of the frames exterior, each pair being aligned parallel to the optical axis;
    a hand strap removably connected to two of the hard points;
    a clip having opposing ends with one end connected to one of the hard points; and
    wherein the clip is operable to detach from and reattach to any of the hard points.

20. The monocular of claim 19, further comprising a mounting surface rigidly connected to the frame's exterior.

21. The monocular of claim 20, wherein the mounting surface is parallel to the optical axis.

22. The monocular of claim 20, wherein the mounting surface is operable to receive a tripod mount.

23. The monocular of claim 20, wherein the mounting surface is operable to receive a picatinny rail mounting plate.

24. The monocular of claim 19, wherein the hand strap is removably connected to any two of the hard points are located on the same side of the frame.

* * * * *